United States Patent
Boley (10) Patent No.: US 11,523,229 B2
(45) Date of Patent: Dec. 6, 2022

(54) HEARING DEVICES WITH EYE MOVEMENT DETECTION

(71) Applicant: GN HEARING A/S, Ballerup (DK)

(72) Inventor: Jonathan Boley, Mundelein, IL (US)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 16/379,678

(22) Filed: Apr. 9, 2019

(65) Prior Publication Data

US 2020/0329316 A1    Oct. 15, 2020

(51) Int. Cl.
*H04R 25/00* (2006.01)
*G06F 3/01* (2006.01)

(52) U.S. Cl.
CPC .............. *H04R 25/40* (2013.01); *G06F 3/013* (2013.01); *H04R 2225/61* (2013.01)

(58) Field of Classification Search
CPC ................ H04R 25/00; H04R 2225/49; H04R 2460/01; H04R 2460/13; H04R 1/1016
USPC .................................. 381/312, 316–318, 380
See application file for complete search history.

(56) References Cited

U.S. PATENT DOCUMENTS

| | | | |
|---|---|---|---|
| 10,292,601 B2 * | 5/2019 | Perkins | A61B 5/14517 |
| 10,631,107 B2 * | 4/2020 | Thomsen | H04R 25/353 |
| 10,678,502 B2 * | 6/2020 | Sheynblat | H04R 1/46 |
| 2003/0002705 A1 * | 1/2003 | Boesen | H04M 1/6066 |
| | | | 381/380 |
| 2014/0152970 A1 * | 6/2014 | Wada | A61B 5/1075 |
| | | | 356/3 |
| 2014/0369537 A1 * | 12/2014 | Pontoppidan | H04R 25/00 |
| | | | 381/314 |
| 2018/0113673 A1 * | 4/2018 | Sheynblat | H04R 1/1016 |

* cited by examiner

*Primary Examiner* — Suhan Ni
(74) *Attorney, Agent, or Firm* — Vista IP Law Group, LLP (57) ABSTRACT

A hearing device includes: a sensor configured for placement in an ear canal of a user of the hearing device, the sensor configured to provide a sensor signal; a processing unit coupled to the sensor; and a receiver coupled to the processing unit, wherein the receiver is configured to provide an audio output; wherein the processing unit is configured to determine a presence of eye-movement related eardrum oscillation based at least in part on the sensor signal. The detected eye-movement related eardrum oscillations may be used to change a processing in the hearing device.

34 Claims, 8 Drawing Sheets

HEARING DEVICES WITH EYE MOVEMENT DETECTION

FIELD

The field of the application relates to hearing devices, and more particularly, to hearing devices with capability for detecting eye movement.

BACKGROUND

Hearing devices such as hearing aids have been used to provide hearing loss compensation for users. Other hearing devices, such as media headsets or earbuds, have also been used to assist users' listening. It may be desirable to have hearing devices with the ability to provide audio sound to users in a way that allows the users to focus sound from a certain direction. Such feature would require a determination of a listener's listening intent. However, determining a listener's listening intent is very difficult to accomplish.

Consider the following example: A hearing aid user is at a cocktail party, engaging in multiple conversations. The hearing aid may have the ability to mix together multiple very narrow microphone beams. Some people in the room may be wearing wireless microphones, streaming to the hearing aid worn by the user. In such scenario, it is very difficult for the hearing aid to decide which signals to amplify and when to amplify. A voice from a particular person in the room may be noise if the hearing aid user is not talking to the person, or it may be useful information if the hearing aid user is interested in listening to the person.

Also, a listener may be interested in a particular sound that is considered noise in one situation, but contains important information (e.g., speech) in another situation. So listening intent cannot be accurately determined based only on the type of sound.

SUMMARY

A hearing device includes: a sensor configured for placement in an ear canal of a user of the hearing device, the sensor configured to provide a sensor signal; a processing unit coupled to the sensor; and a receiver coupled to the processing unit, wherein the receiver is configured to provide an audio output; wherein the processing unit is configured to determine a presence of eye-movement related eardrum oscillation based at least in part on the sensor signal.

Optionally, the sensor comprises a microphone, and the sensor signal comprises a microphone output, and wherein the processing unit is configured to determine whether there is eye-movement-related eardrum or not based at least in part on the microphone output.

Optionally, the sensor comprises a transducer, and the sensor signal comprises a transducer output, and wherein the processing unit is configured to determine whether there is eye-movement-related eardrum or not based at least in part on the transducer output.

Optionally, the sensor comprises an optical sensor, and the sensor signal comprises an optical sensor signal, and wherein the processing unit is configured to determine whether there is eye-movement-related eardrum or not based at least in part on the optical sensor signal.

Optionally, the processing unit is configured to change a sound processing if the processing unit determines that there is eye-movement related eardrum oscillation.

Optionally, the processing unit is configured to change a beam-forming if the processing unit determines that there is eye-movement related eardrum oscillation.

Optionally, the processing unit is configured to change a microphone mode if the processing unit determines that there is eye-movement related eardrum oscillation.

Optionally, the hearing device has at least a first mode and a second mode, and wherein the processing unit is configured to switch from the first mode to the second mode, or from the second mode to the first mode, if the processing unit determines that there is eye-movement related eardrum oscillation.

Optionally, the hearing device has at least a first mode and a second mode; wherein in the first mode, the processing unit is configured to process a first wireless signal from a first source; wherein in the second mode, the processing unit is configured to process a second wireless signal from a second source; and wherein the hearing device is configured to switch from the first mode to the second mode, or from the second mode to the first mode, based at least in part on the sensor signal.

Optionally, the hearing device has at least a first mode and a second mode; wherein in the first mode, the processing unit is configured to process a first wireless signal from a first source; wherein in the second mode, the processing unit is configured to process a microphone signal; and wherein the hearing device is configured to switch from the first mode to the second mode, or from the second mode to the first mode, based at least in part on the sensor signal.

Optionally, the hearing device has at least a first mode and a second mode; wherein in the first mode, the processing unit is configured to mix a first wireless signal from a first source with a microphone signal; wherein in the second mode, the processing unit is configured to mix a second wireless signal from a second source with the microphone signal; and wherein the hearing device is configured to switch from the first mode to the second mode, or from the second mode to the first mode, based at least in part on the sensor signal.

Optionally, the hearing device has at least a first mode and a second mode; wherein in the first mode, the processing unit is configured to mix a first microphone signal corresponding to a first sound source with a wireless signal from a wireless signal source; wherein in the second mode, the processing unit is configured to mix a second microphone signal corresponding to a second sound source with the wireless signal from the wireless signal source; and wherein the hearing device is configured to switch from the first mode to the second mode, or from the second mode to the first mode, based at least in part on the sensor signal.

Optionally, the hearing device has at least a first mode and a second mode; wherein in the first mode, the processing unit is configured to amplify a first wireless signal from a first wireless signal source more than a second wireless signal from a second wireless signal source; wherein in the second mode, the processing unit is configured to amplify the second wireless signal from the second wireless signal source more than the first wireless signal from the first wireless signal source; and wherein the hearing device is configured to switch from the first mode to the second mode, or from the second mode to the first mode, based at least in part on the sensor signal.

Optionally, the processing unit is also configured to determine a direction of eye movement based at least in part on the sensor signal.

Optionally, the processing unit is configured to change a beam-forming direction of a beam-formed signal that corresponds with the direction of the eye movement.

Optionally, the processing unit is also configured to estimate an angle of the eye movement based at least in part on the sensor signal.

Optionally, the hearing device further includes a non-transitory medium storing a model that associates values of sensor waveform characteristic with respective eye positions.

Optionally, the sensor comprises a first microphone, and wherein the hearing device comprises a second microphone coupled to the receiver.

Optionally, the processing unit is configured to remove a signal component in the sensor signal, wherein the signal component is contributed by sound output by the receiver.

Optionally, the processing unit is configured to remove noise from the sensor signal to isolate a signal component that corresponds with the eye-movement related eardrum oscillation.

Optionally, the hearing device further includes a frequency filter configured to filter out a part of the sensor signal having a frequency that is 60 Hz or higher.

Optionally, the processing unit comprises a hearing loss compensation module and a sensor signal processing module.

Optionally, the hearing device further includes a hearing loss compensation module coupled to the receiver.

Optionally, the processing unit is configured to identify eye-movement related eardrum oscillation before occurrence of eye-movement.

Optionally, the processing unit is configured to identify the eye-movement related eardrum oscillation 2 ms or more before the occurrence of the eye-movement.

Optionally, the hearing device further includes a transceiver configured to wirelessly transmit information derived from the sensor signal to an external device.

Optionally, the external device comprises another hearing device.

Optionally, the sensor is in an earpiece, and wherein the earpiece is configured to form a seal with respect to the ear canal.

Optionally, the hearing device further includes a non-transitory medium storing information related to the sensor signal.

Optionally, the information related to the sensor signal comprises a model correlating sensor signal values with eye movement.

Optionally, the information related to the sensor signal comprises logged data regarding the sensor signal, eye movement, hearing device mode, or any combination of the above.

A hearing device includes: a sensor configured for placement in an ear canal of a user of the hearing device, the sensor configured to provide a sensor signal indicating eye-movement related eardrum oscillation; a processing unit coupled to the sensor, wherein the processing unit is configured to provide an output signal based at least in part on the sensor signal indicating eye-movement related eardrum oscillation; and a receiver coupled to the processing unit, wherein the receiver is configured to provide an audio output based at least in part on the output signal.

Optionally, the hearing device has at least a first mode and a second mode; and wherein the processing unit is configured to select the first mode, or the second mode, based at least in part on the sensor signal indicating eye-movement related eardrum oscillation.

Optionally, the first mode of the hearing device has a first sound processing, and the second mode of the hearing device has a second sound processing.

Optionally, the first mode of the hearing device has a first beam-forming, and the second mode of the hearing device has a second beam-forming.

Optionally, the first mode of the hearing device comprises a first microphone mode, and the second mode of the hearing device comprises a second microphone mode.

Optionally, the hearing device is in the first mode, the processing unit is configured to process a first wireless signal from a first source; and wherein when the hearing device is in the second mode, the processing unit is configured to process a second wireless signal from a second source.

Optionally, when the hearing device is in the first mode, the processing unit is configured to process a first wireless signal from a first source; and wherein when the hearing device is in the second mode, the processing unit is configured to process a microphone signal.

Optionally, when the hearing device is in the first mode, the processing unit is configured to mix a first wireless signal from a first source with a microphone signal; and wherein when the hearing device is in the second mode, the processing unit is configured to mix a second wireless signal from a second source with the microphone signal.

Optionally, the hearing device is in the first mode, the processing unit is configured to mix a first microphone signal corresponding to a first sound source with a wireless signal from a wireless signal source; and wherein when the hearing device is in the second mode, the processing unit is configured to mix a second microphone signal corresponding to a second sound source with the wireless signal from the wireless signal source.

Optionally, the processing unit is configured to mix the first microphone signal or the second microphone signal with the wireless signal in a proportion corresponding at least in part to the sensor signal indicating eye-movement related eardrum oscillation.

Optionally, when the hearing device is in the first mode, the processing unit is configured to amplify a first wireless signal from a first wireless signal source more than a second wireless signal from a second wireless signal source; and wherein when the hearing device is in the second mode, the processing unit is configured to amplify the second wireless signal from the second wireless signal source more than the first wireless signal from the first wireless signal source.

A hearing device includes: a sensor configured for placement in an ear canal of a user of the hearing device, the sensor configured to sense a characteristic caused by a movement of an eardrum, and to provide a sensor signal; a processing unit coupled to the sensor; and a receiver coupled to the processing unit, wherein the receiver is configured to provide an audio output; wherein the processing unit is configured to provide an input for the receiver based at least in part on the sensor signal.

Other and further aspects and features will be evident from reading the following detailed description.

DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1A:
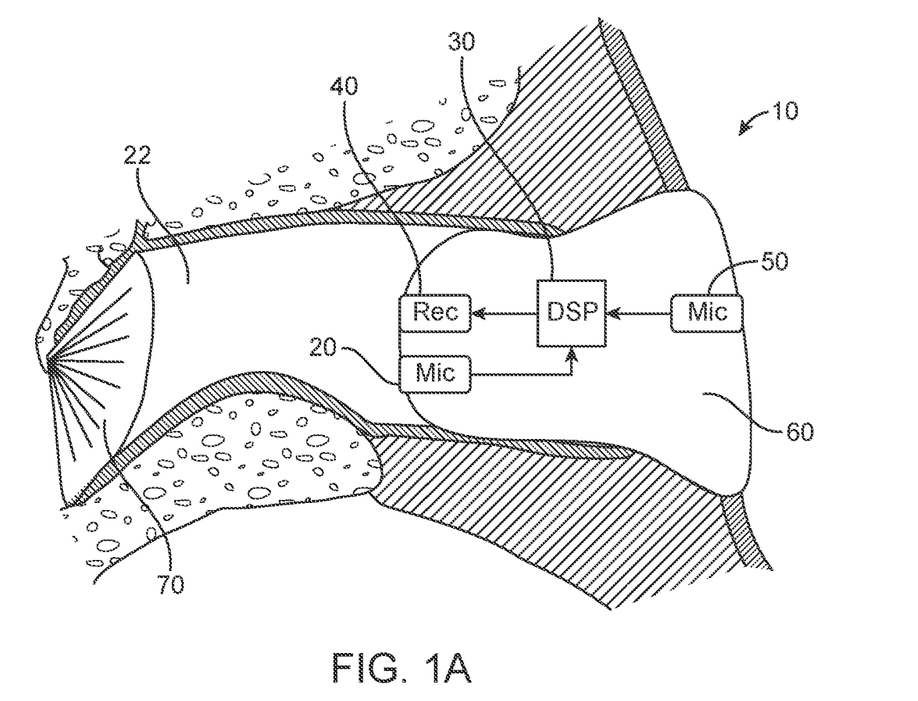
FIGS. 1A-1C illustrates a hearing device in accordance with different embodiments.
Figure 1B:
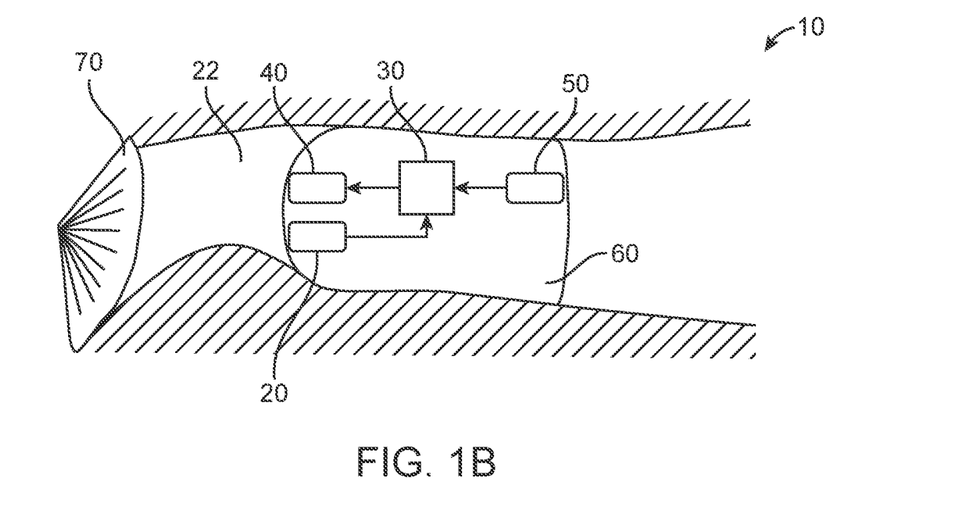
Figure 1C:
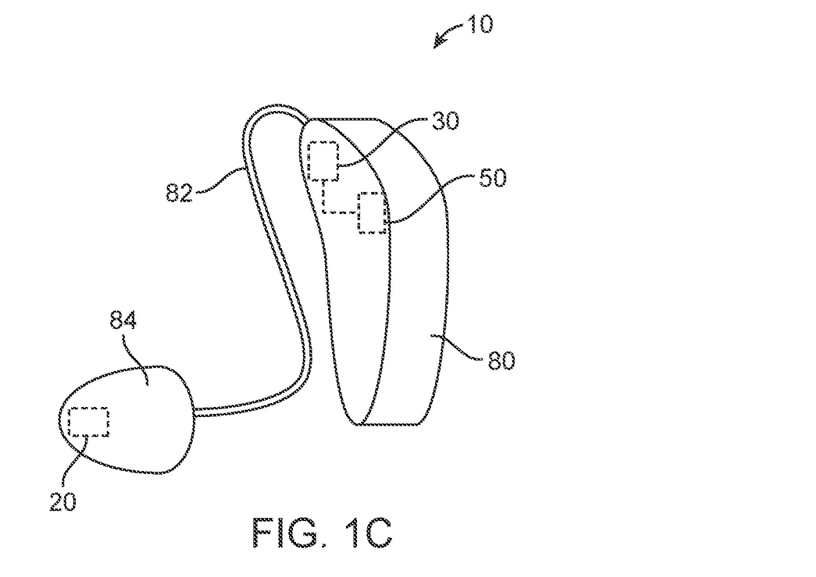

FIGS. 1A-1C illustrates a hearing device 10 in accordance with different embodiments. As shown in FIG. 1A, the hearing device 10 includes a sensor 20 configured for placement in an ear canal 22 of a user of the hearing device 10. The sensor 20 is configured to sense a characteristic associated with a movement (e.g., oscillation) of an eardrum 70, and to provide a sensor signal. The hearing device 10 also includes a processing unit 30 coupled to the sensor 20, a receiver 40 coupled to the processing unit 30, and a microphone 50 coupled to the processing unit 30. The microphone 50 is configured to receive sound from an environment around the user, and to provide a microphone signal. The processing unit 30 is configured to provide a signal output based on the microphone signal from the microphone 50, and the receiver 40 is configured to provide an audio output based on the signal output from the processing unit 30. The processing unit 30 is also configured to determine whether there is eye-movement related eardrum oscillation or not based at least in part on the sensor signal from the sensor 20.

As shown in the figure, the hearing device 10 is in a form of an earpiece 60, and the sensor 20, the processing unit 30, the receiver 40, and the microphone 50 are components of the earpiece 60. In some embodiments, the earpiece 60 may include an earpiece housing accommodating the sensor 20, the processing unit 30, the receiver 40, and the microphone 50. The housing may be made from a rigid material, a soft material (e.g., compliant material), or both. For example, in some cases, the housing may include a rigid housing part (accommodating the sensor 20, the processing unit 30, the receiver 40, and the microphone 50), and a soft (e.g., more flexible than the rigid housing part) casing or seal surrounding at least a part of the rigid housing part. In one implementation, the soft casing or seal may be made from a foam or a gel, which allows the soft casing or the seal to form a seal with respect to the ear canal 22.

The sensor 20 may be any sensor that has the capability to detect a characteristic associated with a movement (e.g., oscillation) of an eardrum 70. It has been discovered that each time the eyes move, the eardrums also move (such eardrum movement is referred to as "eye movement related eardrum oscillation"). In particular, when the eyes move right, both eardrums move left, and vice versa. Gaze is an excellent predictor of conversational attention. For example, if a user is looking at one person, but then glances at another person, one can infer that the other person may be an interesting acoustic source to the user of the hearing device 10. Accordingly, the hearing device 10 can use eye motion to select auditory target(s), and may adjust its signal processing accordingly. In some embodiments, the sensor 20 is configured to detect a movement of the eardrum 70 to thereby identify eye movement that is occurring or that is about to occur. For example, in some embodiments, the sensor 20 comprises a microphone, and the sensor signal comprises a microphone output. In such cases, the hearing device 10 includes two microphones 20, 50. The microphone 50 is configured to detect sound from environment around the user, and the microphone 20 is configured to detect a characteristic (acoustic energy, sound pressure, etc.) resulted from a movement of the eardrum 70. The processing unit 30 is configured to determine whether there is eye-movement-related eardrum or not based at least in part on the microphone output from the sensor 20.

In other embodiments, the sensor 20 comprises a transducer, and the sensor signal comprises a transducer output. In such cases, the processing unit 30 is configured to determine whether there is eye-movement-related eardrum or not based at least in part on the transducer output.

In further embodiments, the sensor 20 comprises an optical sensor, and the sensor signal comprises an optical sensor signal. In such cases, the processing unit 30 is configured to determine whether there is eye-movement-related eardrum or not based at least in part on the optical sensor signal.

Detecting eye movement using the sensor 20 in the ear canal is advantageous because it obviates the need to use camera or other types of optical sensor to view eye movement from outside the user. Also, in some cases, the acoustic signature of an eye movement related eardrum oscillation may be amplified by the occlusion effect (because the hearing device 10 forms a seal with the ear canal). Accordingly, the hearing device 10 may get good signals with a closed fit and microphone in the ear. In some embodiments, the hearing device 10 may include an occlusion cancellation module configured to reduce at least some of the occlusion effect in order to provide comfort for the user of the hearing device 10.

The processing unit 30 may be implemented using hardware, software, or a combination of both. In some embodiments, the processing unit 30 may be any circuit or integrated circuit. By means of non-limiting examples, the processing unit 30 may include a processor, such as a field programmable gated array (FPGA) processor, an ASIC processor, a general-purpose processor, or any other types of processor. The processing unit 30 may be any module having signal processing capability. Also, in some embodiments, the processing unit 30 may include one or more modules (e.g., one or more processors, one or more applications, etc.).

In other embodiments, the hearing device 10 may have different configurations (e.g., shape, form factor, etc.), and therefore the hearing device 10 should not be limited to the example shown in FIG. 1A. For example, in other embodiments, the hearing device 10 may be a completely-in-canal (CIC) device (FIG. 1B). In such cases, the entire hearing device 10 is configured (e.g., sized and/or shaped) for placement within the ear canal 22. In further embodiments, the hearing device 10 may have a behind-the-ear (BTE) unit 80 (FIG. 1C). The BTE unit 80 is configured for placement behind the ear of the user, and may include the processing unit 30 accommodated in a housing of the BTE unit 80. The BTE unit 80 also includes the microphone 50 configured to receive sound from an environment around the user. As shown in the figure, the hearing device 10 also includes an earpiece 84 that comprises the sensor 20. The hearing device 10 also include an elongated member 82 coupled between the BTE unit 80 and the earpiece 84. In some embodiments, the earpiece 84 may also include the receiver 40 configured to output sound for reception by an eardrum of the user. In such embodiments, the elongated member 82 of the hearing device 10 comprises a cable configured to transmit electrical signals from the BTE unit 80 to the receiver 40 in the earpiece 84. In other embodiments, the earpiece 84 does not include any receiver, and instead, the BTE unit 80 comprises the receiver 40 for outputting sound. In such cases, the elongated member 82 of the hearing device 10 comprises a sound tube configured to transmit sound from the BTE unit 80 to the earpiece 84. In either case (i.e., whether the elongated member 82 is a cable or a sound tube), the elongated member 82 includes one or more electrical wires configured to transmit signals between the sensor 20 and the processing unit 30.

Also, in some embodiments, the hearing device 10 may be a part of a binaural hearing device that includes a left hearing device and a right hearing device. The left hearing device is configured for placement at the left ear of the user, and the right hearing device is configured for placement at the right ear of the user. Each of the right hearing device and the left hearing device may be any of the hearing devices 10 of FIGS. 1A-1C. In some embodiments, the left and right hearing devices 10 may operate independently without communication with each other. In other embodiments, the left and right hearing devices 10 may communicate with each other.

In some embodiments, the hearing device 10 is a hearing aid configured to provide hearing loss compensation for the user of the hearing device 10. In other embodiments, the hearing device 10 may be a media device with or without hearing loss compensation capability. For example, the hearing device 10 may be a headset or an earbud configured to communicative coupling with a personal electronic device, such as a cell phone, a tablet, an iPad, a gaming device, a computer, a laptop, etc.

Figure 2:
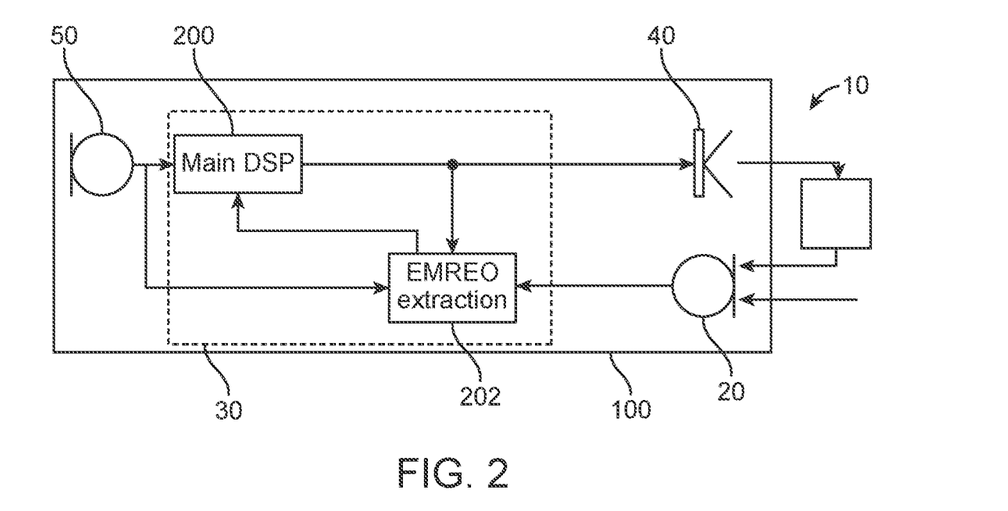
FIG. 2 illustrates an example of a hearing device.

FIG. 2 illustrates an example of internal components of the hearing device 10. As shown in the figure, the hearing device includes the sensor 20 configured to sense a characteristic associated with a movement of an eardrum 70, the processing unit 30, the receiver 40, and the microphone 50. The hearing device 10 also includes a housing 100 configured to accommodate the sensor 20, the processing unit 30, the receiver 40, and the microphone 50. As shown in the figure, the processing unit 30 may include a first module 200 that is configured to process microphone signals from the microphone 50, and a second module 202 configured to process sensor signals from the sensor 20. In the illustrated example, the first module 200 is a hearing loss processing module configured to perform signal processing to thereby provide hearing loss compensation for the user of the hearing device 10. The hearing loss compensation may be based on hearing loss compensation parameter(s) obtained through a fitting process in which the hearing device 10 is fitted based on the specific hearing loss of the user. In some embodiments, the hearing device 10 may have a non-transitory medium storing one or more hearing loss compensation parameters that allow the processing unit 30 to perform hearing loss compensation. Also, in the illustrated example, the second module 202 of the processing unit 30 is a sensor signal processing module configured to process sensor signals from the sensor 20. In one implementation, the second module 202 is an eye movement-related eardrum oscillations (EMREO) module configured to determine whether there is eardrum movement that is related to eye movement, or not, based on sensor signal provided by the sensor 20.

As shown in the figure, in addition to obtaining sensor signal from the sensor 20, the second module 202 is also configured to obtain microphone signal from the microphone 50 and/or signal output from the first module 200. The second module 202 is a signal processing module configured to process the sensor signal from the sensor 20, and also the microphone signal from the microphone 50 and/or the signal output from the first module 200 to determine whether there is eardrum movement related to eye movement. In some cases, the microphone signal from the microphone 50 and/or the signal output from the first module 200 is used by the second module 202 to eliminate or at least reduce signal components that are unrelated or that are not caused by eardrum movement. For example, amplified signal from the first module 200, and signal from the microphone 50 may be used by the second module 202 to isolate and remove self-generated signal (e.g., by receiver 40, microphone 50, etc.). This allows the second module 202 to isolate sensor signal components that are caused by eardrum movement.

Also, as shown in FIG. 2, the second module 202 provides an output to the first module 200, which allows the first module 200 to perform one or more operations based on a result from the processing of the sensor signals by the second module 202. For example, the second module 202 may process the sensor signals to determine that there is eardrum oscillation that is related to eye movement. In such cases, the second module 202 provides an output indicating such result to the first module 200. The second module 202 may also determine a direction of eye movement and eye position (e.g., angle of gaze) based on a processing of the sensor signals from the sensor 20, and transmits such information to the first module 200. Based on the information from the second module 202, the first module 200 may then generate and provide an input for the receiver 40. Accordingly, the processing unit 30 provides an input for the receiver 40 based on the sensor signals from the sensor 20.

Figure 3:
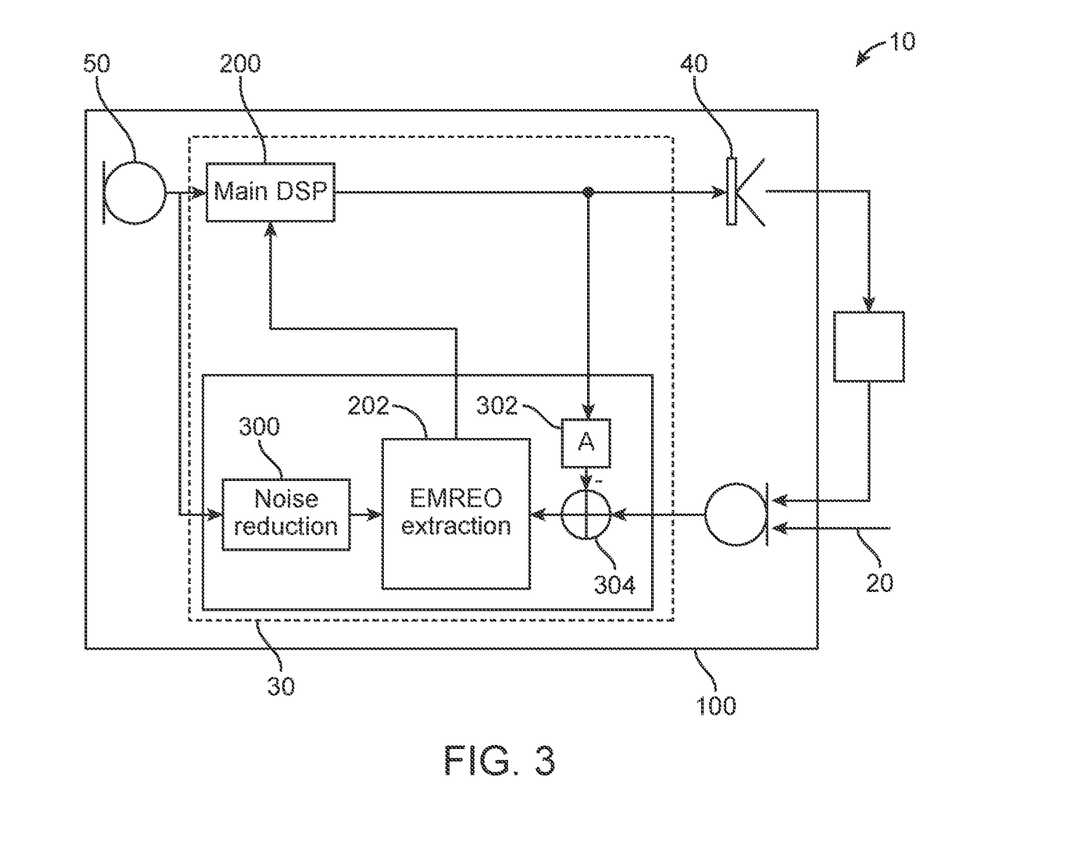
FIG. 3 illustrates another example of a hearing device.

It should be noted that the processing unit 30 is not limited to the example described, and that the processing unit 30 may have other configurations in other embodiments. For example, as shown in FIG. 3, in other embodiments, the processing unit 30 may include a noise reduction unit 300 configured to remove or reduce noise in the microphone signal before the microphone signal is processed by the second module 202. The processing unit 30 also includes an amplifier 302 configured to amplify a signal output from the first module 200, and a subtractor 304 configured to subtract the amplified signal output from the sensor signal before the sensor signal is processed by the EMREO module 202. In one implementation, the subtractor 304 may be implemented using an adder that performs summation operation using a negative of the value provided by the amplifier 302. Thus, as used in this specification, the term "subtractor" may be an adder or a subtractor, and similarly, the term "adder" may be a subtractor or an adder. The noise reduction unit 300, the amplifier 302, and the subtractor/adder 304, are configured to isolate sensor signal components that are caused by eardrum movement.

Figure 4:
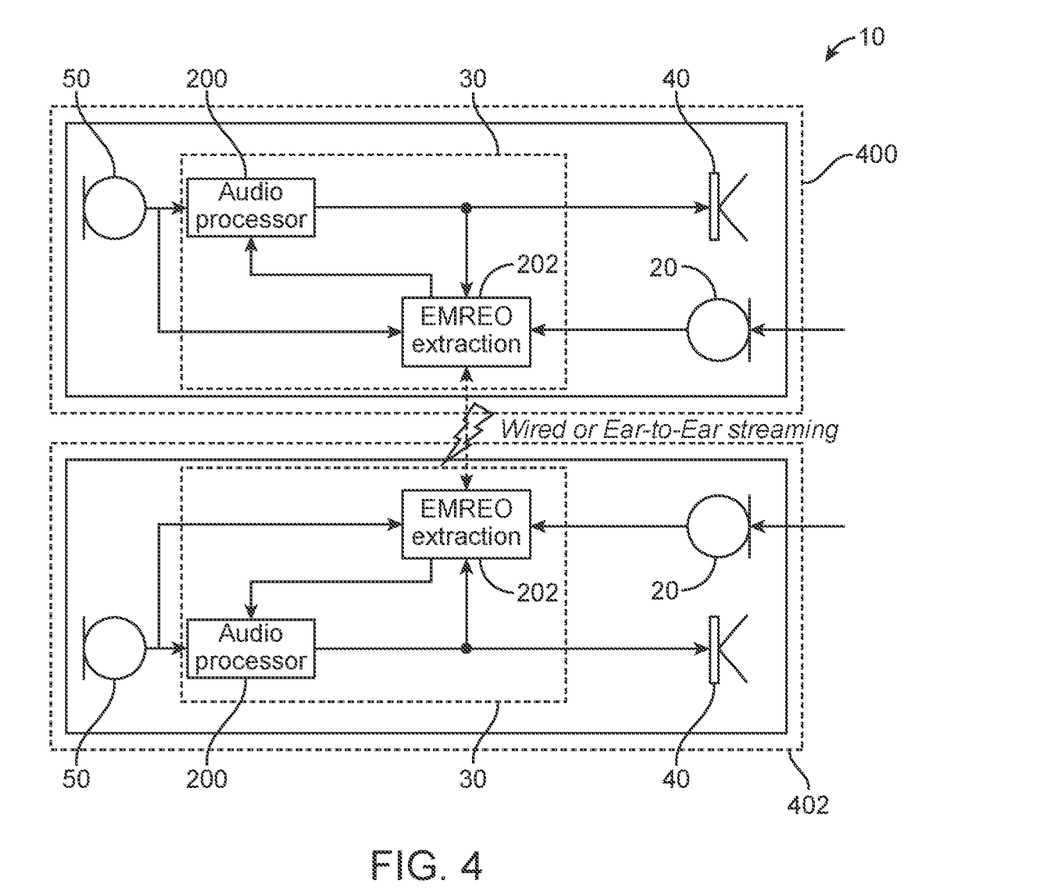
FIG. 4 illustrates another example of a hearing device.

In other embodiments, if the hearing device 10 includes a left hearing device and a right hearing device, information regarding eye movement related eardrum oscillation may be transmitted between the left and right hearing devices via transceivers in the respective left and right hearing devices, or via an electrical cable. For example, as shown in FIG. 4, the hearing device 10 may include a right hearing device 400 and a left hearing device 402. Each of the right and left hearing devices 400, 402 may be any of the hearing device of FIGS. 1A-1C. As shown in FIG. 4, each of the right and left hearing devices 400, 402 has the architecture shown in FIG. 2, but in other embodiments, each of the right and left hearing devices 400, 402 may have other architectures (e.g., such as the one shown in FIG. 3). In the illustrated example shown in FIG. 4, information regarding movement of the eardrum (e.g., eye movement-related eardrum oscillations, amplitudes of such oscillations, maximum amplitude of such oscillations, frequency of the oscillations, detected eardrum movement, etc.) may be transmitted between the right and left hearing devices 400, 402 through respective transceivers (not shown) in the right and left hearing devices 400, 402, or through an electrical cable or wire. In some embodiments, the processing unit 30 of the right hearing device 400 may use the information transmitted from the processing unit 30 of the left hearing device 402 to confirm whether there is eye movement-related eardrum oscillation, or not. Similarly, the processing unit 30 of the left hearing device 402 may use the information transmitted from the processing unit 30 of the right hearing device 402 to confirm whether there is eye movement-related eardrum oscillation, or not. For example, in one implementation, the processing unit 30 (e.g., the module 202) of the right hearing device 400 may determine that there is eye movement related eardrum oscillation based on sensor signal from the sensor 20 of the right hearing device 400. In such cases, the processing unit 30 (e.g., the module 202) of the right hearing device 400 also determines whether there is information from the left hearing device 402 indicating a corresponding eye movement related eardrum oscillation. If there is, then the processing unit 30 of the right hearing device 400 may conclusively determine that there is eye movement related eardrum oscillation. Accordingly, the hearing device 10 may be configured to perform binaural analysis in which it compares processing results from the modules 202 in the right and left hearing devices 400, 402 to improve eye motion estimate.

In some embodiments, if the processing unit 30 has determined that there is eardrum oscillation that is related to eye movement, the processing unit 30 may then change a mode of the hearing device 10. For example, in some embodiments, the processing unit 30 may be configured to change a sound processing if the processing unit 30 determines that there is eye-movement related eardrum oscillation. In other embodiments, the processing unit 30 may be configured to change a beam-forming or beam-steering if the processing unit 30 determines that there is eye-movement related eardrum oscillation. In further embodiments, the processing unit 30 may be configured to change a microphone mode if the processing unit 30 determines that there is eye-movement related eardrum oscillation.

Also, in some embodiments, the hearing device 10 may have at least a first mode and a second mode. In such cases, the processing unit 30 may be configured to switch from the first mode to the second mode if the processing unit 30 determines that there is eye-movement related eardrum oscillation. For example, the first mode of the hearing device 10 may be a first microphone mode, and the second mode of the hearing device 10 may be a second microphone mode. In such cases, the processing unit 30 may be configured to select the first mode or the second mode based at least in part on the sensor signal indicating eye-movement related eardrum oscillation. As another example, in some embodiments, when in the first mode, the processing unit 30 is configured to process a first wireless signal from a first source, and when in the second mode, the processing unit 30 is configured to process a second wireless signal from a second source. As another example, in other embodiments, in the first mode, the processing unit 30 is configured to process a first wireless signal from a first source, and when in the second mode, the processing unit 30 is configured to process a microphone signal from the microphone 50.

In further embodiments, when in the first mode of the hearing device 10, the processing unit 30 is configured to mix a first wireless signal from a first source with a microphone signal, and when in the second mode of the hearing device 10, the processing unit 30 is configured to mix a second wireless signal from a second source with the microphone signal. The hearing device 10 is configured to switch from the first mode to the second mode, or from the second mode to the first mode, based at least in part on the sensor signal. In some cases, the processing unit 30 is configured to mix the first or the second wireless signal with the microphone signal in a proportion corresponding at least in part to the sensor signal indicating eye-movement related eardrum oscillation.

In other embodiments, when in the first mode of the hearing device 10, the processing unit 30 is configured to mix a first microphone signal corresponding to a first sound source with a wireless signal from a wireless signal source, and when in the second mode of the hearing device 10, the processing unit 30 is configured to mix a second microphone signal corresponding to a second sound source with the wireless signal from the wireless signal source. The hearing device 10 is configured to switch from the first mode to the second mode, or from the second mode to the first mode, based at least in part on the sensor signal. In some cases, the processing unit 30 is configured to mix the first or the second microphone signal with the wireless signal in a proportion corresponding at least in part to the sensor signal indicating eye-movement related eardrum oscillation.

In some embodiments, in addition to determining whether there are any eye movement related eardrum oscillations, the processing unit 30 is also configured to determine a direction of the eye movement based at least in part on the sensor signal. When user's eyes move towards the right, both eardrums move to the left, and vice versa. The phase of the sensor signals may be used by the processing unit 30 to determine whether the user is gazing to the left or to the right. In some embodiments, after the processing unit 30 determines the direction of the eye movement, the processing unit 30 may change a mode of the hearing device 10 based on the direction of the eye movement. For example, the processing unit 30 may change a beam-forming or may perform beam-steering in a direction that corresponds with the direction of the eye movement. As another example, the processing unit 30 may change a sensitivity direction of a microphone so that it corresponds with the direction of the eye movement.

Also, in some embodiments, the processing unit 30 may be configured to estimate an angle of the eye movement based at least in part on the sensor signal. In one implementation, the processing unit 30 may be configured to determine an amplitude of the sensor signal from the sensor 20, and determine an angle of the eye movement based on the amplitude of the sensor signal.

In some embodiments, the processing unit 30 is configured to distinguish the eye-movement related eardrum oscillation from other sounds, such as, sound from environment, sound from user's own voice, sound due to body motion (jaw movement, footsteps, etc.), physiological sound (e.g., pulsatile tinnitus, borborygmi, etc.), etc. Also, in some embodiments, the processing unit 30 is configured to remove noise from the sensor signal, and also sound from the receiver 40, to isolate a signal component that corresponds with the eye-movement related eardrum oscillation. In one implementation, the identifying and removal of certain categories of sound in the sensor signals may be achieved using one or more filters (e.g., low pass filter(s), high pass filter(s), band pass filter(s), etc.) that are associated with the categories of sound.

In some embodiments, the hearing device 10 may include a classifier to detect certain movements, such as jaw movement, footsteps, borborygmi, etc. For example, the processing unit 30 may be configured to determine a frequency and/or an amplitude of a microphone signal, and use the determined frequency and/or the amplitude to identify the type of sound. If the sound is of any type other than the sound of eye movement related eardrum oscillation, the processing unit 30 may then filter out the sound in order to isolate the signal for the eye movement related eardrum oscillation.

Since a user's voice may be above 100 Hz, and eye movement related eardrum oscillation is about 30 Hz (e.g., 30 Hz±15 Hz), eye movement related eardrum oscillation may be isolated by applying frequency filter to the sensor signals. For example, in some embodiments, the hearing device 10 may have a low pass filter that filters out signals with frequency that is above 60 Hz, or that is above 80 Hz. Also, in some cases, the hearing device 10 may include a high pass filter that filters out signals with frequency that is below 10 Hz, or that is below 8 Hz. In other embodiments, the hearing device 10 may include a bandpass filter specifically tuned to eye movement related eardrum oscillation frequencies.

In some embodiments, the hearing device 10 may further include a non-transitory medium storing information related to the sensor signal. By means of non-limiting examples, the information may be a model correlating sensor signal values with eye movement, logged data (regarding the sensor signal, eye movement, hearing device mode, or any combination of the foregoing), or any information derived from or involved in the processing of the sensor signals.

Figure 5A:
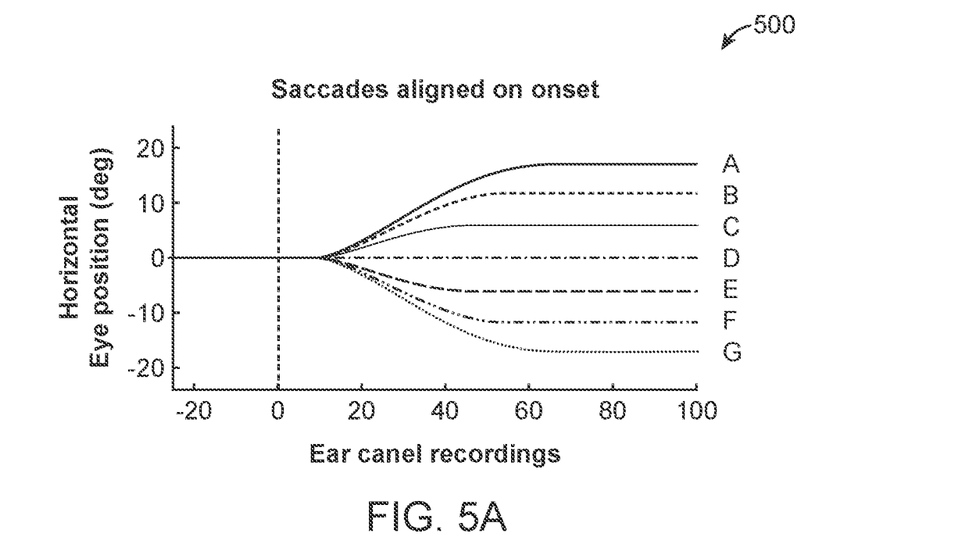
FIG. 5A illustrates a graph of eye positions presented with respect to time.
Figure 5B:
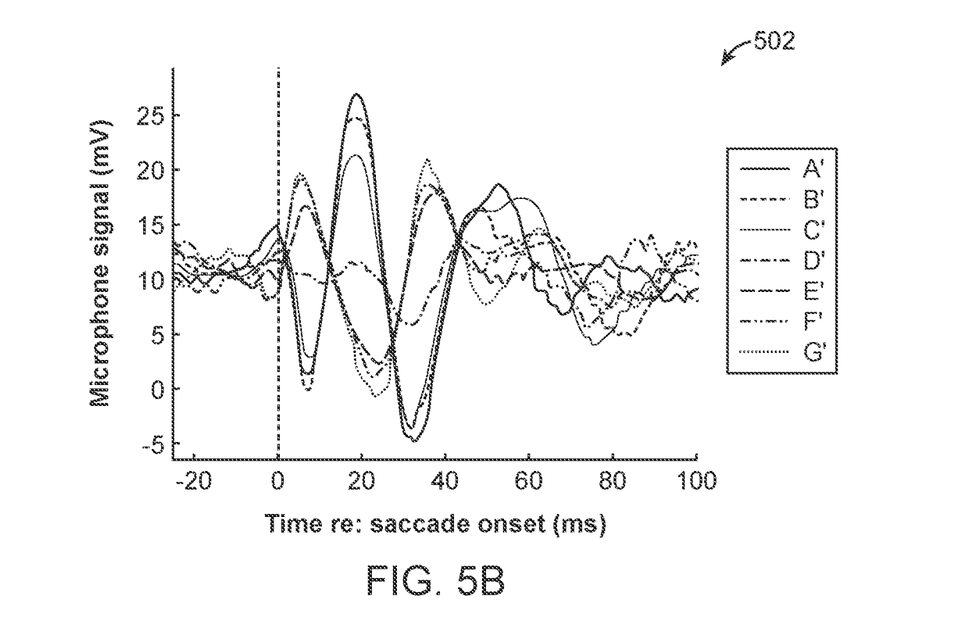
FIG. 5B illustrates a graph of sensor signals that is aligned with the graph of FIG. 5A.

In some embodiments, the processing unit 30 of the hearing device 10 is configured to determine that there is eye movement related eardrum oscillation before the eye movement actually occurs. Since eye movement related eardrum oscillation actually occurs before the actual eye movement, the processing unit 30 of the hearing device 10 can identify such eardrum oscillation before the eye movement actually occurs. In some cases, the processing unit 30 identifies the eardrum oscillation at least 2 ms, at least 4 ms, at least 6 ms, at least 8 ms, at least 10 ms, or at least 12 ms, before the actual eye movement. Therefore, the processing unit 30 can predict occurrence of actual eye movement before the eye movement occurs. In other embodiments, the processing unit 30 of the hearing device 10 may determine that there is eye movement related eardrum oscillation after the eye movement has occurred. FIG. 5A illustrates a graph 500 of eye positions with respect to time, and FIG. 5B illustrates a graph 502 of sensor signals (from the sensor 20, which is a microphone in the illustrated embodiment) that is aligned with the graph of FIG. 5A. The waveforms A' to G' in FIG. 5B correspond respectively with the eye movement curves A to G in FIG. 5A. As shown in these figures, the eardrum oscillations (as indicated by the sensor signals) occur before the actual movement of the eyes. Accordingly, it is possible for the processing unit 30 to detect the eye movement related eardrum oscillation before the actual movement of the eyes.

As shown in FIG. 5B, the waveforms of the sensor signals have certain unique characteristics that allow them to be used to identify whether there is eye movement related eardrum oscillation. When the user's eyes move toward a visual target contralateral to the ear with the sensor 20 generating the sensor signal, the microphone voltage deflected positively, indicating a change in the ear canal pressure, which begins about 10 ms before the onset of actual eye movement. Then a more substantial negative deflection occurs about 5 ms after the onset of the actual eye movement. After the more substantial negative deflection occurs, additional oscillation occurs. The period of the oscillation is about 30 ms (33 Hz). For saccades in the opposite (ipsilateral) direction, the sensor signal follows a similar pattern but in the opposite direction. In some embodiments, the processing unit 30 (e.g., the second module 202) of the hearing device 10 is configured to detect one or more of the above characteristics in the sensor signal waveform to determine whether there is eye movement related eardrum oscillation.

Also, as shown in FIG. 5B, the phase of the sensor signal waveform indicates whether the eye movement is towards the left or right. Accordingly, in some embodiments, the processing unit 30 (e.g., the second module 202) of the hearing device 10 may be configured to determine the direction of the initial deflection and/or the direction of the maximum deflection in the sensor signal waveform, and determine whether the eye movement is towards the left or right based on the determined direction.

In addition, in some embodiments, in addition to determining there is eye movement related eardrum movement, the processing unit 30 of the hearing device 10 may also be configured to determine eye position (e.g., whether eyes turn towards the right or left, and/or an amount of eye-turn). As shown in FIG. 5B, the amplitudes of the sensor signal correspond with different eye positions. The higher amplitude of the sensor signal corresponds with higher gazing angle (with 0° representing eyes looking straight). Accordingly, the processing unit 30 may be configured to determine eye position based on amplitude of the sensor signal from the sensor 20. In one implementation, the hearing device 10 includes a non-transitory medium storing a model that associates different eye positions with respective reference amplitude values (for comparison with maximum amplitude value of sensor signal). When the processing unit 30 obtains the sensor signal from the sensor 20, the processing unit 30 then determines a maximum amplitude of the sensor signal (waveform), and compare the determined maximum amplitude with the reference amplitude values in the model. The processing unit 30 may determine the eye position of the user by identifying the reference amplitude value in the model that is the closest to the determined maximum amplitude, and selecting the eye position in the model that corresponds with the identified reference amplitude value.

Alternatively, or additionally, the non-transitory medium of the hearing device 10 may store a model that associates different eye positions with respective reference amplitude values (for comparison with average amplitude value of sensor signal). When the processing unit 30 obtains the sensor signal from the sensor 20, the processing unit 30 then determines an average amplitude of the sensor signal (waveform), and compare the determined average amplitude with the reference amplitude values in the model. The processing unit 30 may determine the eye position of the user by identifying the reference amplitude value in the model that is the closest to the determined average amplitude, and selecting the eye position in the model that corresponds with the identified reference amplitude value.

In further embodiments, the non-transitory medium of the hearing device 10 may store a model in which multiple reference waveforms correspond with different respective eye positions. The reference waveforms may be created based on data collected from multiple users, or based on data collected from the user of the hearing device 10. When the processing unit 30 obtains the sensor signal from the sensor 20, the processing unit 30 then compares the waveform of the sensor signal with the reference waveforms in the model. The processing unit 30 may determine the eye position of the user by identifying the reference waveform in the model that is the closest to the waveform of the current sensor signal (e.g., by performing pattern comparison, shape comparison, etc.), and selecting the eye position in the model that corresponds with the identified reference waveform.

In other embodiments, the non-transitory medium of the hearing device 10 may store a model in which reference waveform features corresponds with different respective eye positions. The reference waveform features may be obtained by determining reference waveforms based on data collected from multiple users, or based on data collected from the user of the hearing device 10, and then extracting features from the determined reference waveforms. When the processing unit 30 obtains the sensor signal from the sensor 20, the processing unit 30 then performs feature extraction from the waveform of the sensor signal, and compares the extracted feature with the reference waveform features in the model. The processing unit 30 may determine the eye position of the user by identifying the reference waveform feature in the model that is the closest to the extracted waveform feature of the current sensor signal, and selecting the eye position in the model that corresponds with the identified reference waveform feature.

In some embodiments, the signal processing performed by the processing unit 30 to identify eardrum oscillation, and/or to switch mode of the hearing device 10, takes some processing time. Accordingly, by the time that the processing unit 30 has switched mode for the hearing device 10 due to eye movement related eardrum oscillation, some amount of time may have lapsed since the provision of the sensor signals from the sensor 20. In the embodiments in which the eye movement related eardrum oscillation is detected before actual movement of the eyes occurs, the earlier prediction of the eye movement is advantageous because the time gained from earlier detection may be used to offset at least some of the time delay due to processing by the processing unit 30. This may provide a real-time effect for the switching of mode for the hearing device 10. For example, if the eye movement is predicted 10 ms before the actual movement of the eyes, and if the processing unit 30 takes about 10 ms to process the sensor signals from the sensor 20 and to switch mode for the hearing device 10, as soon as the user actually turns his/her eyes, the hearing device 10 may immediately switch mode (e.g., perform a particular beam forming to focus audio sound in the direction of eye turn).

In some embodiments, the hearing device 10 may store a model that associates amplitude values with eye positions. During use, the processing unit 30 accesses such model and applies the model to process sensor signals from the sensor 20 to thereby determine whether the user's eyes turn towards the right or left, and/or an amount of the eye-turn. In one implementation, the model may be provided by the manufacturer of the hearing device 10. The model may be based on data collected from a population of individuals, who use hearing devices with the same or similar sensors (like the sensor 20 of the hearing device 10). Their hearing devices logged data during use, which track sensor signals and the correspondence with respective eye movements. The logged data may be obtained by the manufacturer, who then creates the model. Alternatively, if there was already a model created, the manufacturer may use the additional logged data to improve the model. In some embodiments, the model provided by the manufacturer may be suitable for all users.

In other embodiments, the model may be created during a fitting session when a fitter fits a hearing device for the user. During the fitting session, the fitter may ask the user to turn the eyes to various positions while sensor signals from the sensor 20 are recorded. The recorded sensor signals may then be processed together with the respective eye positions by an application to determine the model. In some cases, the model may simply be a data structure (e.g., a table) that maps features (e.g., average amplitude, maximum amplitude, etc.) of sensor signals with respective eye positions.

In further embodiments, the user of the hearing device 10 may utilize an external device (e.g., remote control, cell phone, accessory device, etc.) to provide the model for the hearing device 10. For example, the user's cell phone may contain an application that provides a user interface for allowing the user to change one or more processing parameters for the hearing device 10. Such application may also provide a user interface for allowing the user to configure a model for determining eye position. In one implementation, the cell phone may present instruction instructing the user to turn eyes to different positions (e.g., horizontal positions). For each eye position achieved by the user, the sensor 20 of the hearing device 10 provides corresponding sensor signals, and the hearing device 10 then transmits the sensor signals or information regarding the sensor signals to the application on the cell phone. The application on the cell phone then processes the sensor signals and their corresponding eye positions to determine the model. The model may then be transmitted from the cell phone to the hearing device 10 for storage in a medium in the hearing device 10.

In still further embodiments, the hearing device 10 itself may be configured to determine the model. In some embodiments, the hearing device 10 may provide an audio instruction through its receiver 40, wherein the audio instruction instructs the user to turn eyes to different positions (e.g., horizontal positions). For each eye position achieved by the user, the sensor 20 of the hearing device 10 provides corresponding sensor signals, and the processing unit 30 of the hearing device 10 then processes the sensor signals and their corresponding eye positions to determine the model. The model may then be stored in a medium in the hearing device 10.

Also, in some embodiments, the processing unit 30 may utilize machine learning or artificial intelligence to train itself to determine eye movement. The processing unit 30, or another processing unit external to the hearing device 10 may build up a database that classifies left turning signals versus right turning signals.

In some embodiments, the processing unit 30 of the hearing device 10 may be configured to provide amplification of sound from the direction of gaze based on a number of glances, or a duration of the glance, in that direction. For example, when the user glances towards the left once, the processing unit 30 may amplify sound from the left side by a first factor. When the user glances towards the left again within a certain period (e.g., within 1 sec, within 2 sec, within 3 sec, etc.), the processing unit 30 may amplify sound from the left side by a second factor that is larger than the first factor. Alternatively, when the user glances towards the left, the hearing device 10 may have a timer that begins a timing to keep track how long the user glances at the left side. The processing unit 30 may not initially amplify sound from the left side. This is advantageous because the user's initial left glance may not indicate listening intent (e.g., the user may glance left for a second, and then glance to other directions of interest). However, as the period in which the user's glance stays at the left side passes (i.e., as the time tracked by the timer increases), the processing unit 30 may progressively increase the amplification of sound from the left side.

Figure 6:
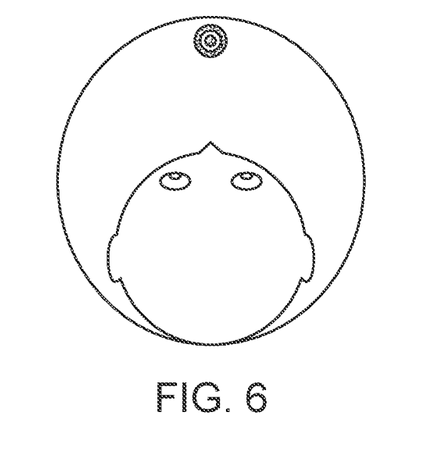
FIG. 6 illustrates a tunneling effect.

In some embodiments, the hearing device 10 described herein may be configured to mix a microphone beam associated with a detected gazing direction, with sound from other direction in a way that emphasizes sound or signal from a source in the direction of gazing. This feature is advantageous over super-directional microphones because it does not cause "tunnel hearing" associated with use of super-directional microphones, or at least causes less tunnel hearing compared to that associated with use of super-directional microphones. FIG. 6 illustrates a tunnel hearing associated with a directional microphone. In tunnel hearing, the hearing device provides audio sound such that the user of the hearing device perceives sound as though it is coming from only a single source while sound from other directions are not perceived by the user. Such effect may be undesirable because it may cause feelings of isolation, social discomfort and/or claustrophobia to user.

Figure 7:
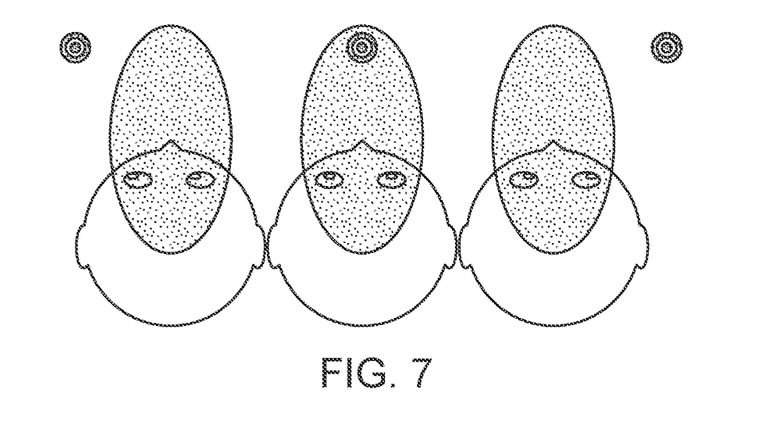
FIG. 7 illustrates beam steering without considering eye movement.

The hearing device 10 described herein is also advantageous over a technique that provides beam steering or beam forming based on only head turn (orientation). FIG. 7 illustrates beam steering without considering eye movement related activity (e.g., eye-movement related eardrum oscillation). As shown in the figure, beam steering or beam forming based on head direction alone may not be accurate enough to track a user's attention. This is because a user's head may not be turned towards a sound source that is of interest to the user. A user's head may not be directionally aligned with the sound source, but the user's eyes may be turned towards the sound source. Also, a person may have a listening intent that is not related to head position or head turn. A person may turn his/her head for other reasons that are unrelated to listening intent. Accordingly, providing beam steering or beam forming based on eye-movement is advantageous because it may provide more accurate beam steering or beam forming. In some embodiments, the processing unit 30 may further consider head turn (head orientation) together with sensor signals from the sensor 20 to determine the user's listening intent. In such cases, the hearing device 10 may include inertial sensor(s) for detecting head turn (orientation). During use, the processing unit 30 obtains sensor signals from the sensor 20 in the ear canal, and also sensor signals from the inertial sensor(s), and determines the user's listening intent based on these signals. For example, based on sensor signals from the sensor 20, the processing unit 30 determines that the user is gazing to the right, indicating that the user is intending to focus listening towards the right. If the processing unit 30 also obtains sensor signals from the inertial sensor(s) indicating that the user is turning his head towards the right within a certain period of time (e.g., within 1 second, within 2 seconds, etc.), then the processing unit 30 may determine, with higher certainty, that the user is intending to focus listening towards the right.

Figure 8:
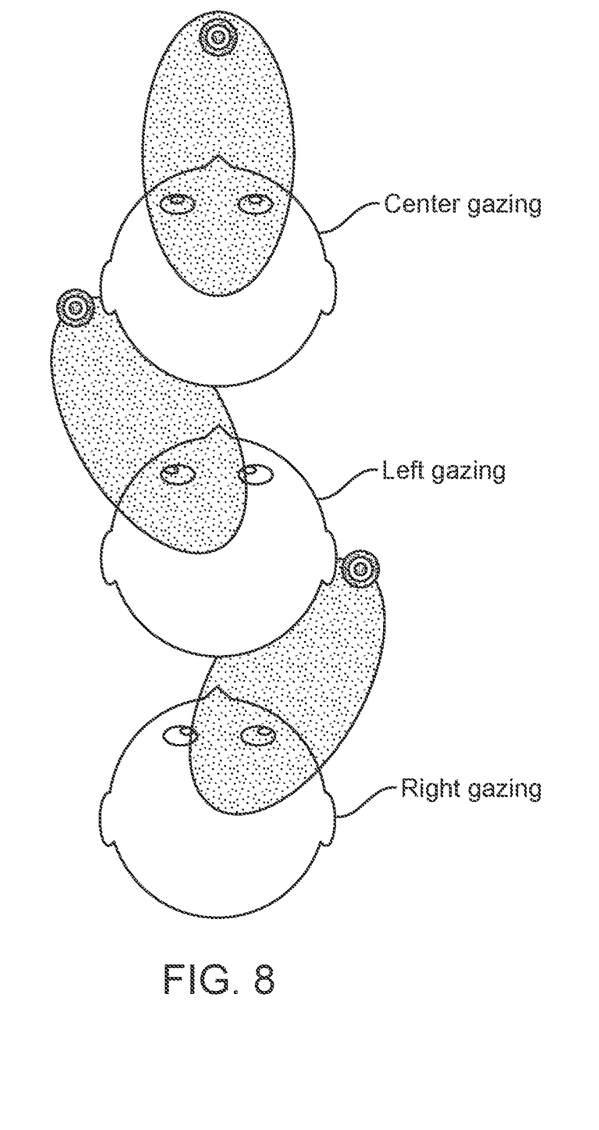
FIG. 8 illustrates beam steering with consideration of eye movement.

FIG. 8 illustrates beam steering or beam forming with consideration of eye movement related activity (e.g., eye-movement related eardrum oscillation). As shown in the figure, beam steering or beam forming based on eye movement related activity allows directionality of sound to be provided to the user of the hearing device 10 such that the directionality corresponds with the user's eye movement. If the user gazes to the right side, the hearing device 10 provides sound directionality so that the user perceives sound coming from the right side. Similarly, if the user gazes to the left side, the hearing device 10 provides sound directionality so that the user perceives sound coming from the left side. If the user gazes straight ahead towards a center, the hearing device 10 provides sound directionality so that the user perceives sound coming from the center.

As discussed, in some embodiments, the hearing device 10 is configured to switch a mode of the hearing device based on a detection of eardrum oscillation related to eye movement. For example, the hearing device 10 may be configured to steer and/or mix microphone beam patterns based on detected eardrum oscillation. This may be useful for very narrow beams because it maximizes SNR but minimizes "tunnel hearing". As another example, the hearing device 10 may be configured to switch and/or mix between different wireless streaming sources based on detected eardrum oscillation.

Figure 9:
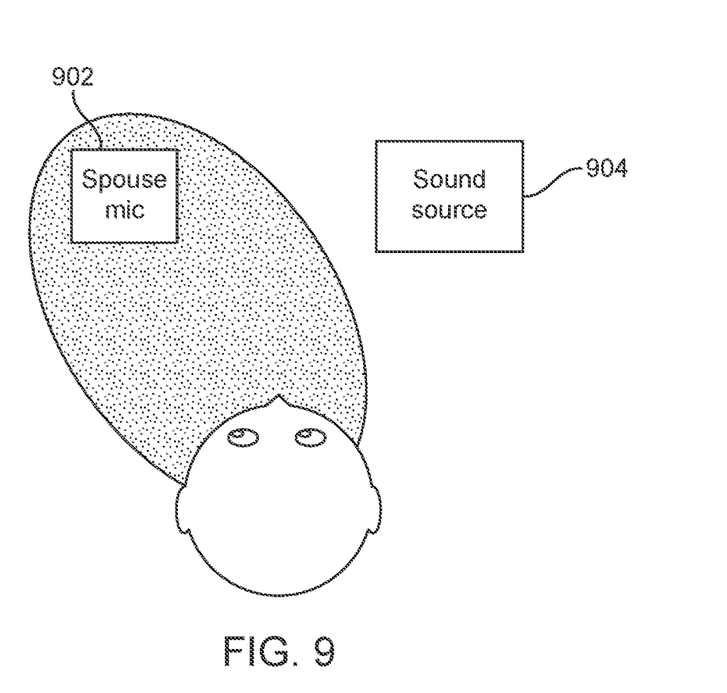
FIG. 9 illustrates an example of a mode switching for a hearing device based on detection of eardrum oscillation related to eye movement.

FIG. 9 illustrates an example of a mode switching for a hearing device based on detection of eardrum oscillation related to eye movement. In the illustrated example, the user of the hearing device 10 is in an environment that has a sound source 904 (e.g., a person, a speaker, etc.) emitting sound, and a wireless signal source 902 (e.g., another person wearing a spouse microphone that is streaming wireless signal, a media device streaming wireless signal, etc., for reception by another device, such as the hearing device 10). In such cases, based on a detection of the eardrum oscillation, the hearing device 10 may change its mode. For example, if the hearing device 10 determines that the user is gazing to the left based on the detected eardrum movement, the hearing device 10 may determine that the user's intent is to focus on the signals from the wireless signal source 902. In such cases, the hearing device 10 may provide sound for the user in a way that isolate the signals from the wireless signal source 902 or that highlights the signals from the wireless signal source 902 more with respect to other sounds (such as that from the sound source 904). On the other hand, if the hearing device 10 determines that the user is gazing to the right based on the detected eardrum movement, the hearing device 10 may determine that the user's intent is to focus on the sound from the sound source 904. In such cases, the hearing device 10 may provide sound for the user in a way that isolate the sound from the sound source 904, or that highlights the sound from the sound source 904 more with respect to other sounds and/or other signals (such as that from the wireless signal source 902).

Figure 10:
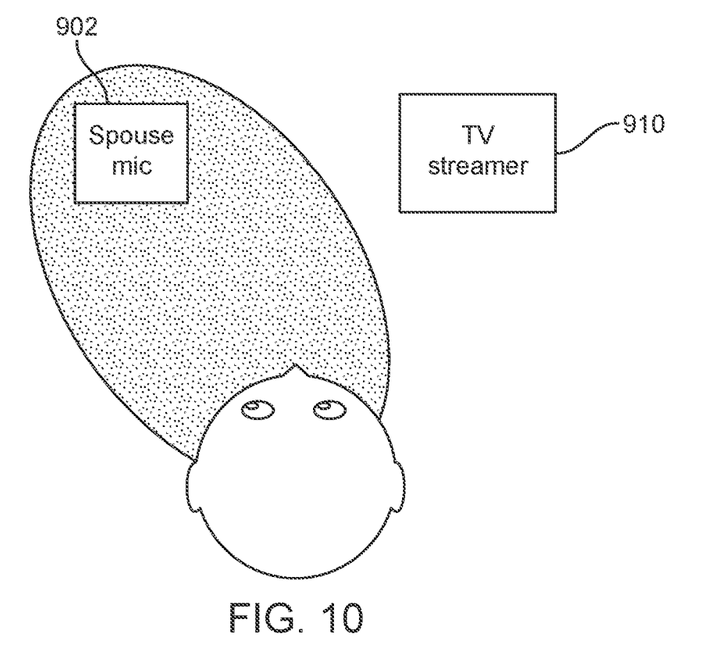
FIG. 10 illustrates another example of a mode switching for a hearing device based on detection of eardrum oscillation related to eye movement.

FIG. 10 illustrates another example of a mode switching for a hearing device based on detection of eardrum oscillation related to eye movement. In the illustrated example, the user of the hearing device 10 is in an environment that has a first wireless signal source 902 (e.g., a first person wearing a first spouse microphone that is streaming wireless signal, a first media device streaming wireless signal, etc., for reception by another device, such as the hearing device 10), and a second wireless signal source 910 (e.g., a second person wearing a second spouse microphone that is streaming wireless signal, a second media device streaming wireless signal, etc., for reception by another device, such as the hearing device 10). In such cases, based on a detection of the eardrum oscillation, the hearing device 10 may change its mode. For example, if the hearing device 10 determines that the user is gazing to the left based on the detected eardrum movement, the hearing device 10 may determine that the user's intent is to focus on the signals from the first wireless signal source 902. In such cases, the hearing device 10 may provide sound for the user in a way that isolate the signals from the first wireless signal source 902, or that highlights the signals from the first wireless signal source 902 more with respect to other sounds and/or signals (such as that from the second wireless signal source 910). In some embodiments, the highlighting of the signals from the first wireless signal source 902 may be accomplished by amplifying the signals from the first wireless signal source 902 more than the signals from the second wireless signal source 910. On the other hand, if the hearing device 10 determines that the user is gazing to the right based on the detected eardrum movement, the hearing device 10 may determine that the user's intent is to focus on signals from the second wireless signal source 910. In such cases, the hearing device 10 may provide sound for the user in a way that isolate the signals from the second wireless signal source 910, or that highlights the signals from the second wireless signal source 910 more with respect to other sounds and/or other signals (such as that from the first wireless signal source 902). In some embodiments, the highlighting of the signals from the second wireless signal source 910 may be accomplished by amplifying the signals from the second wireless signal source 910 more than the signals from the first wireless signal source 902. Accordingly, in some cases, both signals from the first and second wireless signal sources 902, 910 may be mixed together, but the signals from one of the wireless signal sources 902, 910 are amplified more based on the eye motion or gaze direction.

The isolation or highlighting of audio signal or sound may be achieved by the hearing device 10 using amplification factor, filtering, mixing, or any combination of the foregoing. Thus, in some embodiments, a change of a mode of the hearing device 10 may refer to a selection of an amplification factor, an application of an amplification factor, a selection of a filtering, an application of a filtering, a selection of mixing factor, an application of mixing factor, or any combination of the foregoing.

It should be noted that the hearing device 10 is not limited to the examples described, and that the hearing device 10 may have other configurations and features in other embodiments.

For example, in some embodiments, eye motion may be utilized as a measure of cognitive load, and hearing device setting(s) of the hearing device 10 may be adjusted to minimize cognitive load. For example, during a fitting session, a user of the hearing device 10 may be given a task. Then eye motion is tracked during the task, and quantified (e.g., microsaccade rate determined). A fitter (e.g., audiologist, dispenser, etc.) can then make adjustment to setting(s) of the hearing device 10 based on the quantified eye motion. By means of non-limiting examples, hearing device setting(s) may include noise reduction, compression time constants, etc., or a combination of the foregoing. Additionally, or alternatively, the processing unit 30 of the hearing device 10 may quantify eye motion during normal use (e.g., outside a fitting session), and may automatically adjust hearing device setting(s) during use based on the quantified eye motion.

Also, in other embodiments, the processing unit 30 may be configured to determine relative location and spatial cues, and to one or both of these pieces of information to determine the user's listening intent. Examples of these features are described in U.S. Pat. Nos. 9,699,574, and 9,749,755, the entirety of both of these patents are expressly incorporated by reference herein.

Furthermore, in some embodiments, the hearing device 10 may include an adaptive linear filter configured to filter out sound signals that are unrelated to eye movement related eardrum oscillation. The parameter(s) of the adaptive linear filter may be determined by the processing unit 30 based on individual user's characteristic, or based on a population of individuals. Also, the processing unit 30 may include machine learning configured to fine-tune the parameter(s) of the adaptive linear filter based on data collected from the use of the hearing device 10.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A hearing device comprising:
a sensor configured for placement in an ear canal of a user of the hearing device, the sensor configured to sense an eardrum movement, and to provide a sensor signal based on the sensed eardrum movement;
a processing unit coupled to the sensor; and
a receiver coupled to the processing unit, wherein the receiver is configured to provide an audio output;
wherein the processing unit is configured to detect an eye-movement based at least on a part of the sensor signal having a frequency that is different from a frequency of a human voice.

2. The hearing device of claim 1, wherein the sensor comprises a microphone configured to sense the eardrum movement by detecting acoustic pressure inside the ear canal, wherein the sensor signal comprises a microphone output, and wherein the processing unit is configured to detect the eye-movement based at least in part on the microphone output.

3. The hearing device of claim 1, wherein the sensor comprises a transducer, and the sensor signal comprises a transducer output, and wherein the processing unit is configured to detect the eye-movement based at least in part on the transducer output.

4. The hearing device of claim 1, wherein the sensor comprises an optical sensor, and the sensor signal comprises an optical sensor signal, and wherein the processing unit is configured to detect the eye-movement based at least in part on the optical sensor signal.

5. The hearing device of claim 1, wherein the processing unit is configured to change a sound processing based on the detected eye-movement.

6. The hearing device of claim 1, wherein the processing unit is configured to change a beam-forming based on the detected eye-movement.

7. The hearing device of claim 1, wherein the processing unit is configured to change a microphone mode based on the detected eye-movement.

8. The hearing device of claim 1, wherein the hearing device has at least a first mode and a second mode, and wherein the processing unit is configured to switch from the first mode to the second mode, or from the second mode to the first mode, based on the detected eye-movement.

9. The hearing device of claim 1, wherein the hearing device has at least a first mode and a second mode;
wherein in the first mode, the processing unit is configured to process a first wireless signal from a first source;
wherein in the second mode, the processing unit is configured to process a second wireless signal from a second source; and
wherein the hearing device is configured to switch from the first mode to the second mode, or from the second mode to the first mode, based at least in part on the sensor signal.

10. The hearing device of claim 1, wherein the hearing device has at least a first mode and a second mode;
wherein in the first mode, the processing unit is configured to process a first wireless signal from a first source;
wherein in the second mode, the processing unit is configured to process a microphone signal; and
wherein the hearing device is configured to switch from the first mode to the second mode, or from the second mode to the first mode, based at least in part on the sensor signal.

11. The hearing device of claim 1, wherein the hearing device has at least a first mode and a second mode;
wherein in the first mode, the processing unit is configured to mix a first wireless signal from a first source with a microphone signal;
wherein in the second mode, the processing unit is configured to mix a second wireless signal from a second source with the microphone signal; and
wherein the hearing device is configured to switch from the first mode to the second mode, or from the second mode to the first mode, based at least in part on the sensor signal.

12. The hearing device of claim 1, wherein the hearing device has at least a first mode and a second mode;
wherein in the first mode, the processing unit is configured to mix a first microphone signal corresponding to a first sound source with a wireless signal from a wireless signal source;
wherein in the second mode, the processing unit is configured to mix a second microphone signal corresponding to a second sound source with the wireless signal from the wireless signal source; and
wherein the hearing device is configured to switch from the first mode to the second mode, or from the second mode to the first mode, based at least in part on the sensor signal.

13. The hearing device of claim 1, wherein the hearing device has at least a first mode and a second mode;
wherein in the first mode, the processing unit is configured to amplify a first wireless signal from a first wireless signal source more than a second wireless signal from a second wireless signal source;
wherein in the second mode, the processing unit is configured to amplify the second wireless signal from the second wireless signal source more than the first wireless signal from the first wireless signal source; and
wherein the hearing device is configured to switch from the first mode to the second mode, or from the second mode to the first mode, based at least in part on the sensor signal.

14. The hearing device of claim 1, wherein the processing unit is also configured to determine a direction of the eye movement based at least in part on the sensor signal.

15. The hearing device of claim 14, wherein the processing unit is configured to change a beam-forming direction of a beam-formed signal that corresponds with the direction of the eye movement.

16. The hearing device of claim 14, wherein the processing unit is also configured to estimate an angle of the eye movement based at least in part on the sensor signal.

17. The hearing device of claim 14, wherein the processing unit is configured to determine the direction of the eye movement as left movement or right movement based at least in part on the sensor signal.

18. The hearing device of claim 1, further comprising a non-transitory medium storing a model that associates values of sensor waveform characteristic with respective eye positions.

19. The hearing device of claim 1, wherein the processing unit is configured to remove a signal component in the sensor signal, wherein the signal component is contributed by sound output by the receiver.

20. The hearing device of claim 1, wherein the processing unit is configured to remove noise from the sensor signal to isolate a signal component that corresponds with eye-movement related eardrum oscillation.

21. The hearing device of claim 1, further comprising a frequency filter configured to filter out a portion of the sensor signal having a frequency that is 60 Hz or higher.

22. The hearing device of claim 1, wherein the processing unit comprises a hearing loss compensation module and a sensor signal processing module.

23. The hearing device of claim 1, further comprising a hearing loss compensation module coupled to the receiver.

24. The hearing device of claim 1, wherein the eye-movement is an occurred eye-movement, and wherein the processing unit is configured to detect the occurred eye-movement based at least in part on the sensor signal.

25. The hearing device of claim 24, wherein the eye-movement is an imminent eye-movement, and wherein the processing unit is configured to detect the imminent eye-movement 2 ms or more before an occurrence of an actual eye-movement.

26. The hearing device of claim 1, further comprising a transceiver configured to wirelessly transmit information derived from the sensor signal to an external device.

27. The hearing device of claim 26, wherein the external device comprises another hearing device.

28. The hearing device of claim 1, wherein the sensor is in an earpiece, and wherein the earpiece is configured to form a seal with respect to the ear canal.

29. The hearing device of claim 1, further comprising a non-transitory medium storing information related to the sensor signal.

30. The hearing device of claim 29, wherein the information related to the sensor signal comprises a model correlating sensor signal values with eye movement data.

31. The hearing device of claim 29, wherein the information related to the sensor signal comprises logged data regarding the sensor signal, eye movement data, hearing device mode, or any combination of the above.

32. The hearing device of claim 1, wherein the sensor is configured to sense the eardrum movement by sensing a characteristic caused by a movement of an eardrum.

33. The hearing device of claim 1, wherein the eye-movement is an imminent eye-movement, and wherein the processing unit is configured to detect the imminent eye-movement based at least in part on the sensor signal.

34. The hearing device of claim 1, wherein the processing unit is configured to detect the eye-movement without using a camera or an optical sensor to view an eye of the user from outside the user.

\* \* \* \* \*